Feb. 13, 1968  P. A. G. LEPELLETIER  3,368,651
CONTROL MEANS FOR SELF-ENERGIZED BRAKE SYSTEMS
Filed Dec. 5, 1966  4 Sheets-Sheet 1

INVENTOR
PIERRE ANDRÉ GEORGES LEPELLETIER
By Young & Thompson
ATTYS.

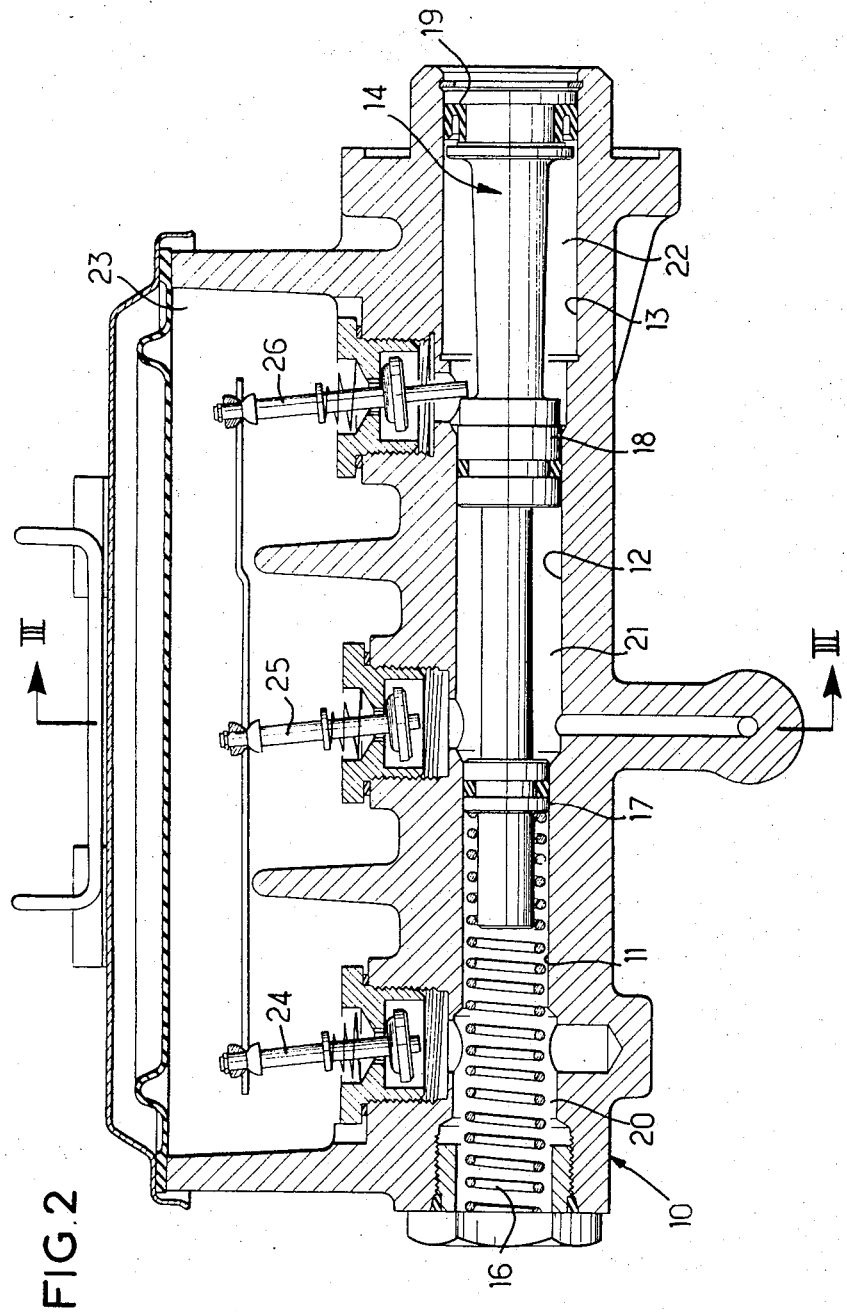

INVENTOR
PIERRE A. G. LEPELLETIER
BY Young + Thompson
ATTYS.

Feb. 13, 1968     P. A. G. LEPELLETIER     3,368,651

CONTROL MEANS FOR SELF-ENERGIZED BRAKE SYSTEMS

Filed Dec. 5, 1966     4 Sheets-Sheet 4

INVENTOR
PIERRE ANDRÉ GEORGES LEPELLETIER
BY Young & Thompson
ATTYS.

United States Patent Office 3,368,651
Patented Feb. 13, 1968

3,368,651
CONTROL MEANS FOR SELF-ENERGIZED BRAKE SYSTEMS
Pierre Andre Georges Lepelletier, Chatou, Yvelines, France, assignor to Societe Anonyme Francaise du Ferodo, Paris, France, a corporation of France
Filed Dec. 5, 1966, Ser. No. 599,250
Claims priority, application France, Jan. 4, 1966, 44,734
6 Claims. (Cl. 188—152)

The present invention relates to hydraulic braking installations, especially for automobile vehicles, in which each of the brakes of a first axle has a double supply circuit and comprises a primary chamber defined at least in part by a primary piston, and a secondary chamber defined at least in part by a secondary piston, the said primary and secondary pistons being associated with the application members of the brake, a master cylinder driving equal or proportional volumes into the primary chambers of the brakes of the said first axle by means of two primary circuits, the secondary chambers of the brakes of the said first axle being connected to a secondary circuit which is capable of communicating with a secondary chamber of the master cylinder, known as the secondary pressure chamber, the said secondary pressure chamber communicating on the one hand with the chamber of the master cylinder coupled to the secondary circuit, known as the transfer chamber, and on the other hand with the two brakes of a second axle for the application of the brakes, the said master cylinder comprising a pressure station having piston means which are responsive to a comparison of the pressure in the secondary pressure chamber and of the two primary pressures.

The transfer chamber of the master cylinder is preferably provided in such manner that it diminishes in volume during the actuation of the master cylinder.

The first axle may for example be a front axle of the vehicle and the second axle may be a rear axle. In the text which follows, the brakes of the first axle are referred to as the front brakes and the brakes of the second axle as the rear brakes.

In a braking installation of the kind referred to above, the performances are excellent during the course of braking on forward running, both as regards the effectiveness, the stability and the balancing, but it may happen that the power of the rear brakes is relatively low during the course of braking on reverse running, especially when the transfer chamber of the master cylinder is of small capacity.

According to the invention, the piston means of the pressure station of the master cylinder comprise a plunger which is subjected on one side to the atmospheric pressure existing in a chamber connected to a tank, and to the pressures obtaining in two chambers respectively connected to two primary circuits, and on the other side to the pressure existing in the secondary pressure chamber, while a valve open when at rest is interposed between the secondary circuit of the brakes of the first axle and the said secondary pressure chamber.

By virtue of this arrangement, during braking when running in reverse, when the pressure of the secondary circuit of the brakes of the first axle is low, the plunger moves downwards under the impulsion of the primary pressures and closes the valve driving the oil towards the brakes of the second axle, which ensures effective braking. The closure of the valve makes it possible to prevent any expenditure of oil to the brakes of the first axle and thus to reserve the return oil for the points of the installation at which it then acts with the greatest effect.

It will be noted that the various joints of the plunger of the pressure station are all immersed in oil and thus ensure perfect service.

In accordance with another characteristic feature, the plunger normally remains in abutment at rest during forward running under the effect of the high secondary pressure of the brakes of the first axle with the valve open, which makes it possible to make the brakes of the second axle take advantage of this high secondary pressure.

In a preferred form of construction, the valve is further provided with a tail which is engaged in the plunger, so that any pressure transmitted into the secondary pressure chamber causes a backward movement of the valve with respect to its seating, starting from a pre-determined threshold value.

By virute of this arrangement, the valve is held open even if, during the course of braking on forward running over ground having low adhesion with a very high force applied to the braking pedal, the front brakes become locked, the plunger being permitted to move away from its abutment position. In this way, excessive rise of pressure in the rear brakes is avoided, thus preventing a dangerous locking of these brakes.

The objects, characteristic features and advantages of the invention will be further brought out in the description which follows below of forms of construction chosen by way of example, reference being made to the accompanying drawings, in which:

FIG. 2 is a view on a larger scale of a master cylinder according to the invention, in longitudinal section taken along the line II—II of FIG. 3;

Figure 1:
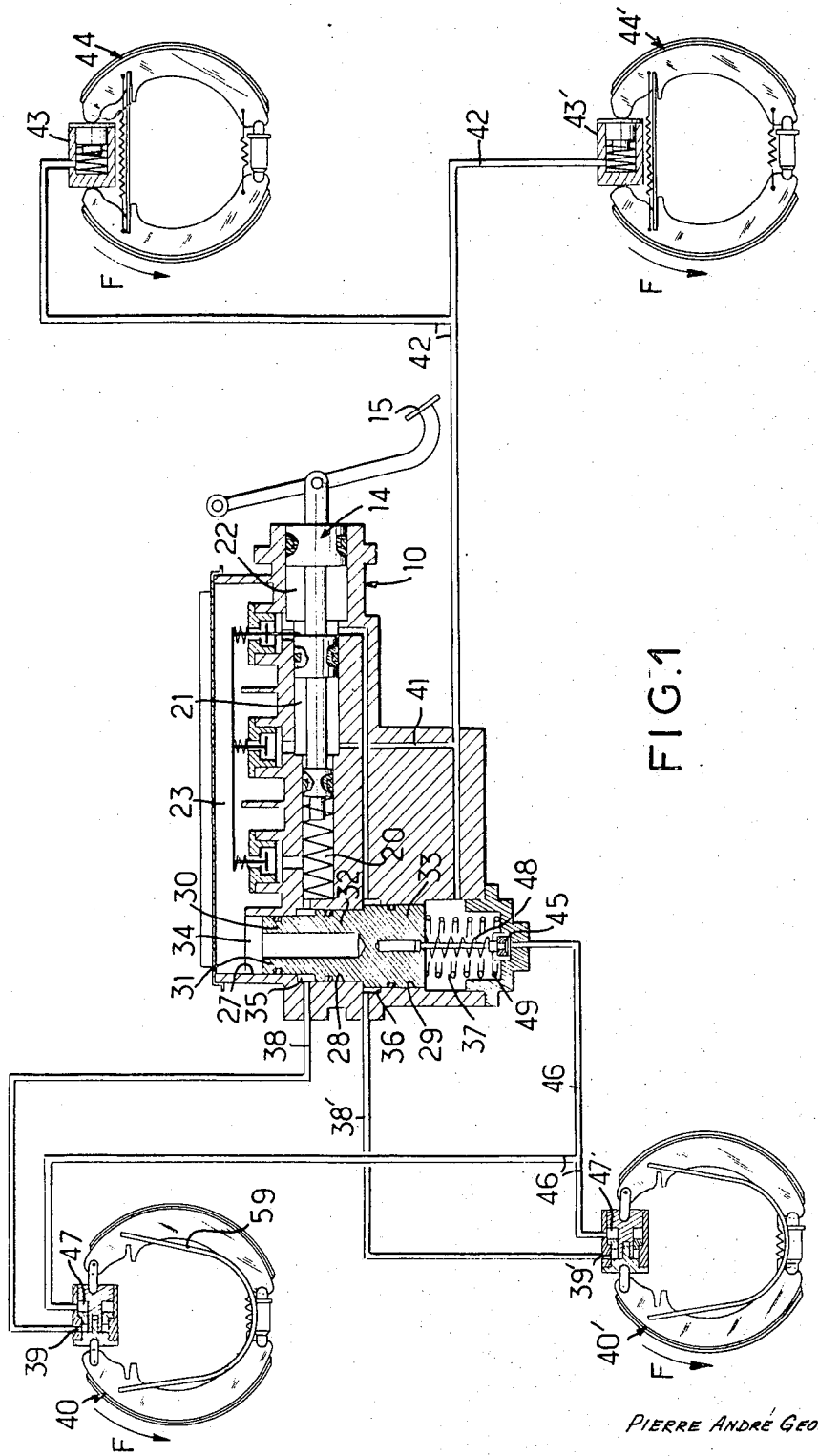
FIG. 1 is a general diagrammatic view of a braking installation for automobile vehicles in accordance with the invention.

Reference will first be made to FIGS. 1 to 4 which relate to an application of the invention to a braking installation for automobile vehicles. There can be seen at 10 the master cylinder, at 40 and 40' the brakes of a first axle, for example the front brakes, and at 44 and 44' the brakes of the second axle, namely the rear brakes.

As shown in FIG. 2, the master cylinder 10 comprises three stepped bores 11, 12 and 13, and a master piston 14 which is actuated by the brake pedal 15 and brought back to the position of rest by a return spring 16. The master piston 14 comprises three pistons 17, 18 and 19, respectively engaged in the bores 11, 12 and 13. At the front of the piston 17 is formed a first primary thrust chamber 20. Between the pistons 17 and 18 is formed a secondary transfer chamber 21. Between the pistons 18 and 19 is formed a second primary thrust chamber 22. The chambers 20, 21 and 22 are connected to a tank 23 through the intermediary of clapper valves 24, 25 and 26, intended to be tilted by the master piston 14. Each of the valves 24, 25 and 26 is partly open when the pedal is at rest and is closed when the piston 14 commences its inward movement under the action of the said pedal 15.

Figure 3:
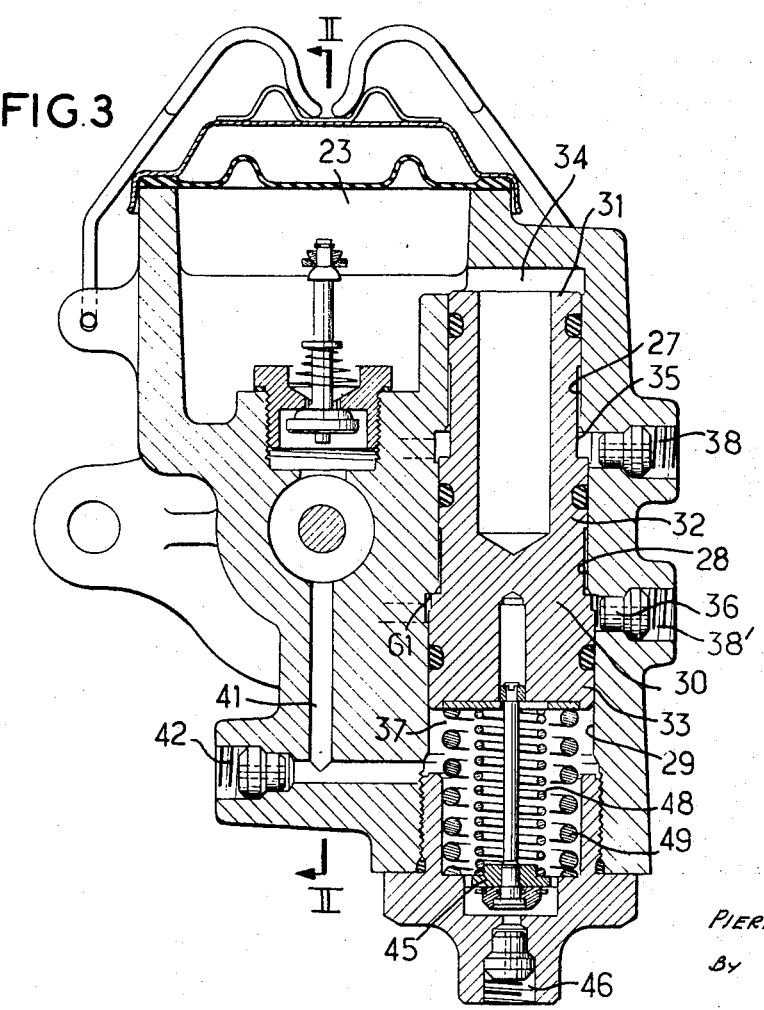
FIG. 3 is a view of this master cylinder in transverse section taken along the line III—III of FIG. 2.

The master cylinder 10 further comprises a pressure connection station having three bores in line 27, 28 and 29 (see FIGS. 1 and 3). The axis of the bores 27, 28 and 29, is perpendicular and laterally displaced with respect to the axis of the bores 11, 12 and 13. In the bores 27, 28 and 29 is engaged a plunger 30 comprising three pistons 31, 32 and 33, respectively engaged in the bores 27, 28 and 29.

Above the piston 31 is formed a space 34 communicating with the tank 23. Between the pistons 31 and 32 is arranged a first primary pressure chamber 35. Between the pistons 32 and 33 is arranged a second primary pressure chamber 36. Below the piston 33 is formed a secondary pressure chamber 37.

Figure 4:
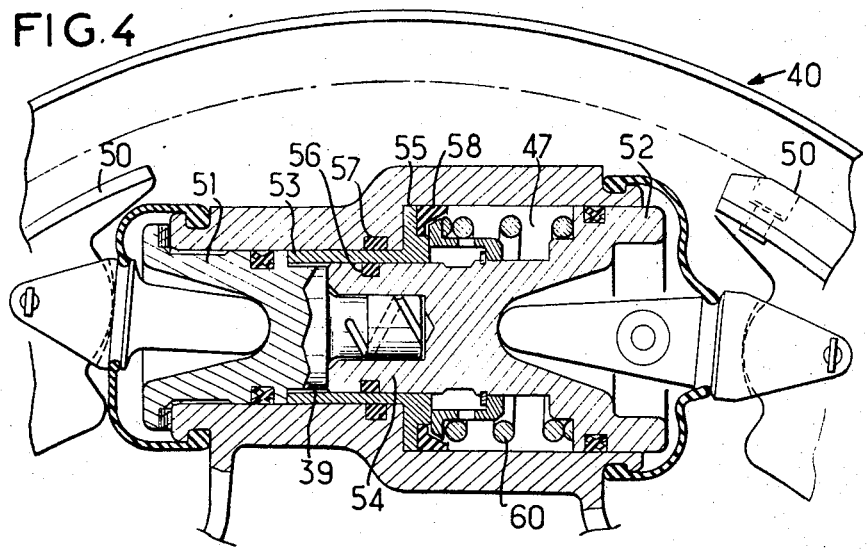
FIG. 4 is a detail view of a front wheel brake cylinder.

The first primary pressure chamber 35 is connected on the one hand to the first primary thrust chamber 20 and on the other hand through a conduit 38 to a so-called primary chamber 39 of the right-hand front brake 40 (see FIGS. 1 and 4).

The second primary pressure chamber 36 is connected on the one hand to the second primary thrust chamber 22 and on the other hand through a conduit 38' to a so-called primary chamber 39' of the left-hand front brake 40'.

The master cylinder 10 is arranged in such manner that it drives equal or proportional volumes (equal in the example shown) into the primary chambers 39 and 39' of the front brakes 40 and 40'. In addition, the master cylinder 10 drives a small volume of oil from the chamber 21 during the depression of the pedal 15.

The secondary pressure chamber 37 is continuously connected on the one hand through a conduit 41 to the secondary transfer chamber 21 and on the other hand through the conduits 42 to the cylinders 43 and 43' of the right-hand 44 and left-hand 44' rear brakes.

The secondary pressure chamber 37 is further connected through the intermediary of a clapper-valve 45 to a conduit 46 connected to secondary chambers 47 and 47' of the front brakes 40 and 40'. The valve 45, open when at rest, tends to be pushed into the closed position by a spring 48 supported on the plunger 30.

The plunger 30 is responsive to a comparison of the pressure at 37 with the pressures at 35 and 36, and is further subjected to the action of a spring 49 which tends to bring the said plunger 30 to its position of rest.

Each front brake 40 and 40' comprises jaws 50, 50' co-operating with drums. Particular reference will be made to FIG. 4, in which is shown a front wheel cylinder, for example the cylinder of the right-hand front brake 40.

The primary chamber 39 is formed at least in part by a primary piston 51, while the secondary chamber 47 is defined at least in part by a secondary piston 52.

The primary and secondary pistons 51 and 52 are associated with the jaws 50 in such manner that the braking reaction produces a higher pressure in the secondary chamber 47 than in the primary chamber 39 during forward running (arrow F of FIG. 1), and a lower pressure in the secondary chamber 47 than in the primary chamber 39 when running in reverse (direction opposite to the arrow F).

A separating ring 53 is interposed between the primary chamber 39 and the secondary chamber 47. The ring 53 surrounds a tail 54 of the secondary piston 52, and is engaged in the primary bore, while a collar 55 of the ring 53 is engaged in the secondary bore. A sealing joint 56 is provided between the ring 53 and the tail 54. A sealing ring 57 is provided between the ring 53 and the primary bore. The collar 55 is further provided with a sealing joint 58 co-operating with the secondary bore.

The two jaws 50 are subjected to the action of a restoring spring 59 (see FIG. 1) while the secondary piston 52 co-operates with a centering spring 60.

A similar construction is provided for the left-hand front brake 40'.

The rear brakes 44 and 44' are also of the type with jaws co-operating with drums, but they have a single supply system by means of the cylinders 43 and 43'. They have a self-releasing action during the course of braking on forward running (arrows F of FIG. 1) while their action is self-applying during the course of braking on reverse running.

During the course of braking during forward running, the volumes of oil driven through the conduits 38 and 38' into the primary chambers 39 and 39' of the front brakes 40 and 40' cause an outward movement of the primary pistons 51 and 51' which bring the jaws 50 and 50' into contact with their respective drums. The secondary pistons 52 and 52' move inwards towards the primary chambers 39 and 39'. In each front brake, there is a movement of expansion of the jaws and a movement of the moving system in the direction of the arrow F. The braking reaction produces in the secondary chambers 47 and 47', a high pressure which is the same due to the intercommunication of the chambers 47 and 47' through the conduit 46.

As the secondary pressure in the pressure chamber 37 is considerably higher than the pressures in the primary pressure chambers 35 and 36, the plunger 30 is pushed back upwards and is applied in abutment, for example against a shoulder such as 61 (see FIG. 3) and the valve 45 is kept open. The two primary pressures are independent of each other, which permits of an appropriate balancing by the secondary pressure at the level of the front brakes 40 and 40'. The secondary pressure transmitted by the conduit 46 has free access through the open valve 45 and the conduit 42 to the rear brakes 44 and 44' which are thus applied.

In the case of braking during reverse running, the reactions of the jaws 50 and 50' of the front brakes 40 and 40' become reversed and are simply absorbed by fixed points. No amplified thrust of the jaws 50 and 50' is then applied to the secondary pistons 52 and 52'.

The primary pressures at 35 and 36 have a preponderant action on the plunger 30 which moves downwards towards the bottom, forcing the valve 45 against its seating. The pressure in the chamber 37 becomes greater than the pressure in the conduit 46. This enables oil to be driven into the conduits 42, both by the effect of diminution of volume of the chamber 37 and by the effect of the reduction of volume of the chamber 21. The closure of the valve 45 makes it possible to avoid sending oil into the front brakes which would not contribute to the braking effect in a very effective manner.

During the course of braking during forward running, the rear brakes 44 and 44', which operate with a self-releasing action, receive a high oil pressure (arrow F), while during the course of braking in reverse running, when they operate with a self-applying action (direction opposite to the arrow F), they receive a smaller oil pressure. It will be appreciated that, by means of the arrangement of the master cylinder of FIG. 1, comprising a one-piece plunger 30 and a valve 45, the quantities of oil admitted to the rear brakes 44 and 44' are as high as possible and permit a very effective operation of the brakes which then work with a self-applying action.

Figure 5:
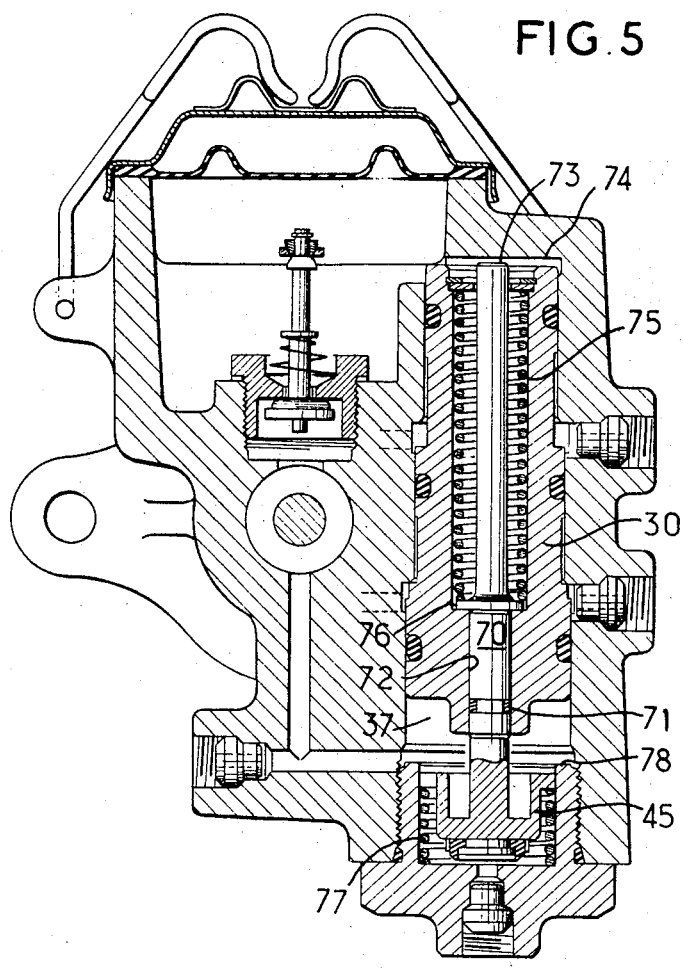
FIG. 5 is a view similar to that of FIG. 3, but relating to an alternative form of construction.

Reference will now be made to FIG. 5, in which means have been provided so as to avoid any risk of excessive application of the rear brakes when a braking action is effected during forward running over ground which has a low adhesion, for example frost-covered ground, by a very considerable force applied to the brake pedal.

The arrangement of the pressure station is similar to that which has been described with reference to FIG. 3, but the valve 45 comprises a tail 70 which is engaged with a joint 71 in a bore 72 of the plunger 30. The tail 70 is adapted to co-operate in abutment by its extremity 73 with a bearing surface 74 of the body of the master cylinder. A spring 75 acts on a collar 76 of the tail 70 and tends to push the valve 45 downwards.

There is shown at 77 a restoring spring for the valve 45 in the position of opening and at 78 a stop intended to receive the plunger 30 in the bottom position.

During forward running and as soon as the secondary pressure transmitted by the brakes of the first axle, that is to say the front brakes, reaches a predetermined suitably-chosen value, the valve 45 moves upwards slightly and comes into abutment at 73–74 on the body of the master cylinder, which has the effect of holding it open a fortiori for all pressures higher than the threshold value chosen.

During reverse running, when the pressure transmitted by the brakes of the first axle, that is to say the front brakes, is less than the threshold value for backward movement of the valve, the latter closes normally as soon as the plunger 30 moves downwards, and then remains closed, the section of the tail 70 being chosen to be substantially less than the section of application of the valve 45 on its seating.

The arrangement of FIG. 5 gives the same results as that of FIG. 3 during the course of braking during forward running and reverse running under normal conditions. On ground having low adhesion, the secondary pressure falls considerably but nevertheless it still remains greater than the pre-determined value chosen as the closure threshold of the valve. If the driver then presses sufficiently hard on the brake pedal so that the plunger 30 is permitted to move downwards, this latter will simply come into abutment at 78 by means of a slight backward movement of the moving parts of the brakes of the first axle, that is to say of the front brakes, and a slight additonal depression of the brake pedal.

Due to the fact that the opening of the valve 45 is maintained, any high pressure in the conduits 42 capable of resulting in excessive application of the rear brakes 44 and 44' is reduced to the lowest value of the conduit 46 which is precisely fixed by the adhesion of the ground, which enables any locking of the rear wheels to be avoided and thus keeps the vehicle on its trajectory, even if the front wheels are locked.

It will of course be understood that the invention is not limited to the form described and shown but includes all alternative forms.

What I claim is:

1. A hydraulic braking installation, especially for automobile vehicles, in which each of the brakes of a first axle has a double supply circuit and comprises a primary chamber defined at least in part by a primary piston, and a secondary chamber defined at least in part by a secondary piston, said primary and secondary pistons being associated with the application members of the brake, a master cylinder driving equal or proportional volumes into the primary chambers of the brakes of said first axle by means of two primary circuits, the secondary chambers of the brakes of said first axle being connected to a secondary circuit which is adapted to communicate with a secondary chamber of said master cylinder, known as the secondary pressure chamber, said secondary pressure chamber communicating on the one hand with the chamber of the master cylinder which is connected to the secondary circuit, known as the transfer chamber, and on the other hand with the two brakes of a second axle for the application of said brakes, said master cylinder comprising a pressure station having piston means which are responsive to a comparison of the pressure in said secondary pressure chamber with the two primary pressures, said piston means of the pressure station of said master cylinder being constituted by a plunger subjected on one side to the atmospheric pressure existing in a chamber connected to a tank and to the pressures obtaining in two chambers respectively connected to two primary circuits, and on the other side to the pressure existing in said secondary pressure chamber, while a valve is interposed between the secondary circuit of the brakes of said first axle and said secondary pressure chamber.

2. A hydraulic braking installation as claimed in claim 1, in which a spring is adapted to act on said plunger in the same direction as the pressure existing in the secondary pressure chamber so as to force said plunger into abutment.

3. A hydraulic braking installation as claimed in claim 1, in which said valve is urged in the direction of closure by a spring.

4. A hydraulic braking installation as claimed in claim 1, in which said valve is provided with a tail engaged in said plunger so that any pressure transmitted to said secondary pressure chamber and acting on said tail tends to hold the said valve open.

5. A hydraulic braking installation as claimed in claim 1, in which a calibrated spring acts on said valve in the direction of opening.

6. A hydraulic braking installation as claimed in claim 1, in which a calibrated spring tends to make said valve fast with said plunger.

References Cited

UNITED STATES PATENTS

| 2,920,451 | 1/1960 | Milster | 188—152 X |
| 3,305,051 | 2/1967 | Maurice | 188—152 |
| 3,306,678 | 2/1967 | Lepelletier | 303—6 X |

FERGUS S. MIDDLETON, *Primary Examiner.*

G. E. HALVOSA, *Assistant Examiner.*